US012276147B2

(12) United States Patent
Danijel et al.

(10) Patent No.: US 12,276,147 B2
(45) Date of Patent: Apr. 15, 2025

(54) HINGE ASSEMBLY

(71) Applicant: TITUS D.O.O. DEKANI, Dekani (GI)

(72) Inventors: Kozlovic Danijel, Dekani (SI); Svara Valter, Izola (SI); David Pecar, Pobegl (SI)

(73) Assignee: TITUS D.O.O. DEKANI, Dekani (SI)

(*) Notice: Subject to any disclaimer, the term of this patent is extended or adjusted under 35 U.S.C. 154(b) by 32 days.

(21) Appl. No.: 18/268,424

(22) PCT Filed: Dec. 17, 2021

(86) PCT No.: PCT/EP2021/086466
§ 371 (c)(1),
(2) Date: Jun. 20, 2023

(87) PCT Pub. No.: WO2022/136163
PCT Pub. Date: Jun. 30, 2022

(65) Prior Publication Data

US 2024/0018814 A1 Jan. 18, 2024

(30) Foreign Application Priority Data

Dec. 22, 2020 (GB) ...................................... 2020363

(51) Int. Cl.
*E05F 1/08* (2006.01)
*E05D 3/16* (2006.01)

(52) U.S. Cl.
CPC ............ *E05D 3/16* (2013.01); *E05Y 2201/21* (2013.01); *E05Y 2201/264* (2013.01); *E05Y 2900/20* (2013.01)

(58) Field of Classification Search
CPC ........... E05Y 2900/20; E05Y 2900/202; E05Y 2900/204; E05Y 2900/208; E05Y 2201/25;
(Continued)

(56) References Cited

U.S. PATENT DOCUMENTS 6,243,918 B1 * 6/2001 Zetti .......................... E05D 3/16 16/334
7,574,775 B2 * 8/2009 Zetti .................... E05D 11/1064 16/370
(Continued)

FOREIGN PATENT DOCUMENTS

CN 202401876 U 8/2012
CN 102995999 A 3/2013
(Continued)

OTHER PUBLICATIONS

International Search Report issued in corresponding International Application No. PCT/EP2021/086466 mailed Apr. 7, 2022 (3 pages).
(Continued)

*Primary Examiner* — Chuck Y Mah
(74) *Attorney, Agent, or Firm* — Lathrop GPM LLP

(57) ABSTRACT

A hinge assembly including a first fitment portion, a second fitment portion, and a link assembly including at least seven hinge axes. The linkage assembly includes two levers directly pivotally mounted to the first fitment portion. The hinge assembly further includes a damping device pivotally mounted between the said two levers.

9 Claims, 3 Drawing Sheets

(58) Field of Classification Search
CPC ........... E05Y 2201/26; E05Y 2201/626; E05Y 2201/20; E05Y 2201/21; E05Y 2201/261; E05Y 2201/264; E05Y 2600/53; E05F 5/006; E05F 5/02; E05F 5/027; E05D 11/1021; E05D 11/1042; E05D 11/105; E05D 11/1064; E05D 7/04; E05D 7/0407; E05D 7/125; E05D 3/16; E05D 3/142
See application file for complete search history.

(56) References Cited

U.S. PATENT DOCUMENTS

| | | | | |
|---|---|---|---|---|
| 11,377,889 B2 * | 7/2022 | Zetti | ......................... | E05D 3/16 |
| 2013/0152339 A1 * | 6/2013 | Hung | ........................ | E05F 5/02<br>16/50 |
| 2015/0267452 A1 * | 9/2015 | Zetti | ......................... | E05D 3/06<br>16/50 |
| 2015/0361709 A1 * | 12/2015 | Stuke | ........................ | E05F 5/10<br>16/352 |
| 2021/0270071 A1 * | 9/2021 | Salice | ..................... | E05F 5/006 |

FOREIGN PATENT DOCUMENTS

| | | | | | |
|---|---|---|---|---|---|
| CN | 203640462 U | | 6/2014 | | |
| CN | 107288457 A | | 10/2017 | | |
| WO | WO-2019206578 A1 | * | 10/2019 | ............... | E05D 3/16 |

OTHER PUBLICATIONS

Written Opinion of the International Searching Authority issued in corresponding Application No. PCT/EP2021/086466 mailed Apr. 7, 2022 (6 pages).

* cited by examiner

Fig 3a
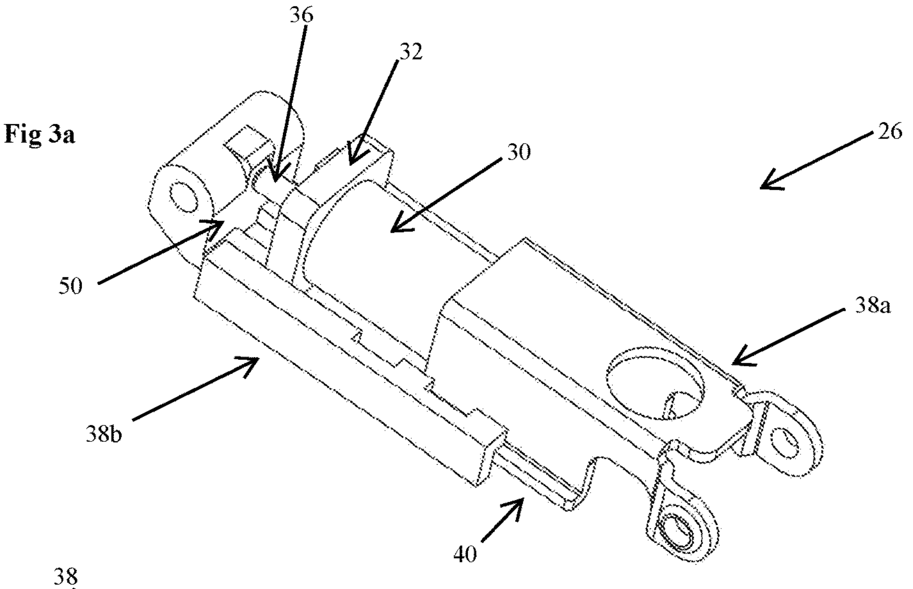
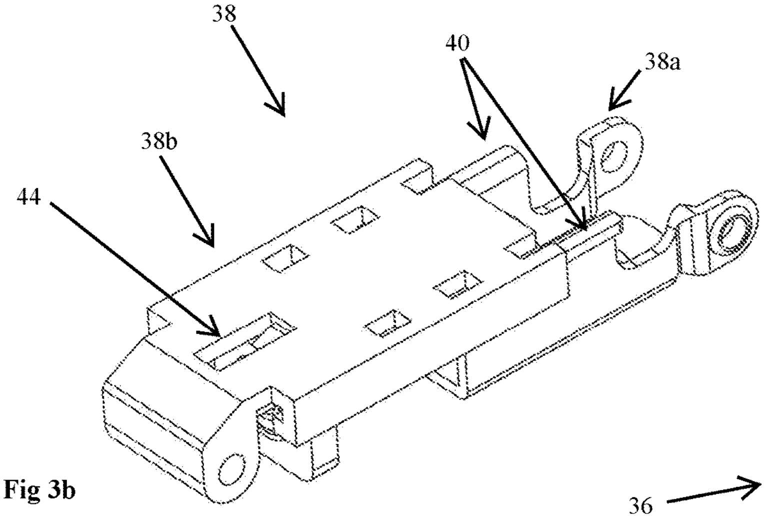
Fig 3b
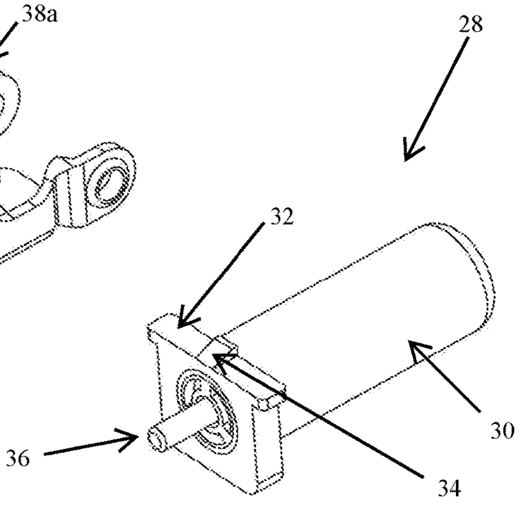
Fig 3c
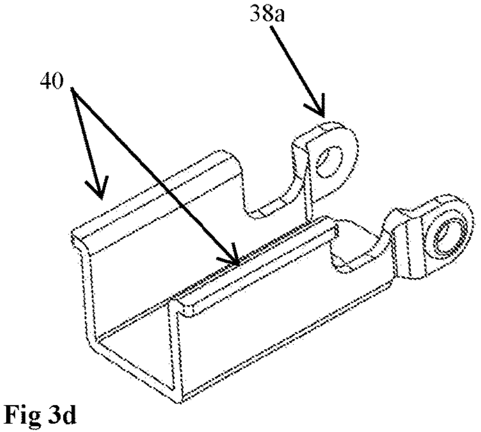
Fig 3d
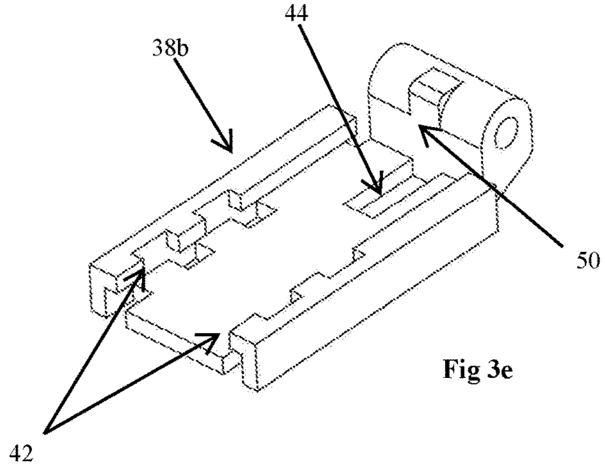
Fig 3e

HINGE ASSEMBLY

This application is a U.S. National Stage of Patent Cooperation Treaty International Application Number PCT/EP2021/086466, filed 17 Dec. 2021, which claims priority to Great Britain Patent Application Number 2020363.4, filed 22 Dec. 2020, the entireties of which are hereby incorporated by reference.

The present arrangement relates to a hinge assembly, and particularly to a wide angle hinge.

BACKGROUND

Wide angle hinges are known in the art. Typically they comprise a linkage assembly that comprises seven pivot axes. It has become common to look to incorporate a damper device onto a hinge assembly. However, it is advantageous to maintain the hinge assemble as small as possible, whilst seeking to maintain robust working characteristics and long operating life.

It is also advantageous to shield the damping device as much as possible to minimize the amount of debris that can come into contact therewith.

Additionally, it is important to provide a hinge that does not suffer from the re-bounce phenomena, whereby a damper action does not function during a high-speed closing action of a door to which the hinge is attached.

Hinge assemblies can also be the source of injury, especially to young children, if their fingers become caught in the linkage assembly.

An example of prior art that suffers from some or all of the above drawbacks is EP1815096. In some embodiments, a damper assembly is position on a lever in the linkage mechanism that is connected to the hinge cup. Accordingly, the arrangement is susceptible to re-bounce, whereby, during a high-energy closing action, rather than causing a damped closure, the hinge bounces off the damper. Such an arrangement also puts stress on the hinge arrangement, thus potentially reducing its working lifetime.

SUMMARY

According to the present invention there is provided a hinge assembly comprising: a first fitment portion; a second fitment portion, and a link assembly comprising at least seven hinge axes, wherein the link assembly comprises two levers directly pivotally mounted to the first fitment portion, wherein the hinge assembly further comprises a damping device pivotally mounted between the said two levers.

The present arrangement thus solves the above problems.

It is preferred that the first fitment is a hinge arm, and it is further preferred that the second fitment is a hinge cup. Accordingly, the two levers between which the damping device is mounted are pivotally connected to the hinge arm. Because the damper is connected between levers that are not connected to the hinge cup, experimentation has shown that the hinge assembly does not significantly suffer from the re-bounce effect.

In preferred arrangement the link assembly comprises four levers. It is preferred that two of the levers are directly pivotally attached to the hinge cup, and two are directly pivotally attached to the hinge arm. It is preferred that the pivot mountings of the damping device are separate to the seven pivot axes of the linkage assembly. Accordingly, the present hinge assembly comprises nine pivot axes.

It is preferred that the damping device comprises a linear damper. Preferably the linear damper comprises a damper housing.

It is preferred that the damper housing is supported by a damper support unit. The damper support unit is typically located below at least a portion of the linkage assembly. Accordingly, the damper takes up less space in the cabinet to which the hinge assembly is located. The hinge assembly is also shielded from the ingress of debris.

Preferably the damper support unit is pivotally attached to the two levers directly connected to the hinge arm.

Preferably the damper support unit comprises first and second parts. It is preferred that they are pivotally connected to a respective one of said two levers. It is particularly preferred that the first and second parts of the damper support unit are slidably engaged with one another. It is preferred that the two parts of the damper support unit are operable to slide with respect to one another as the hinge assembly is moved from an open position to a closed position.

It is preferred that the damper housing is operable to slide with respect to the damper support unit. It is also preferred that one or both of the damper housing or the damper support unit comprise means to limit the path of travel of the damper housing with respect to the damper support unit.

The damper support unit further provides means to cover a gap in the linkage assembly. Therefore, the linkage assembly does not comprise means to entrap or pinch a user's fingers. Typically in seven axis link assemblies a gap exists between the second and third levers when the hinge assembly is in its open most position. This gap closes as the hinge assembly closes, thus potentially being a trap hazard. The provision of a damper assembly as above closes this gap.

In order that the present invention be more readily understood, specific embodiments thereof will now be described with reference to the accompanying drawings.

BRIEF DESCRIPTION OF THE DRAWINGS

FIGS. 3*a* to 3*e* show a damper support structure and linear damper.

DESCRIPTION OF PREFERRED EMBODIMENTS

Figure 1:
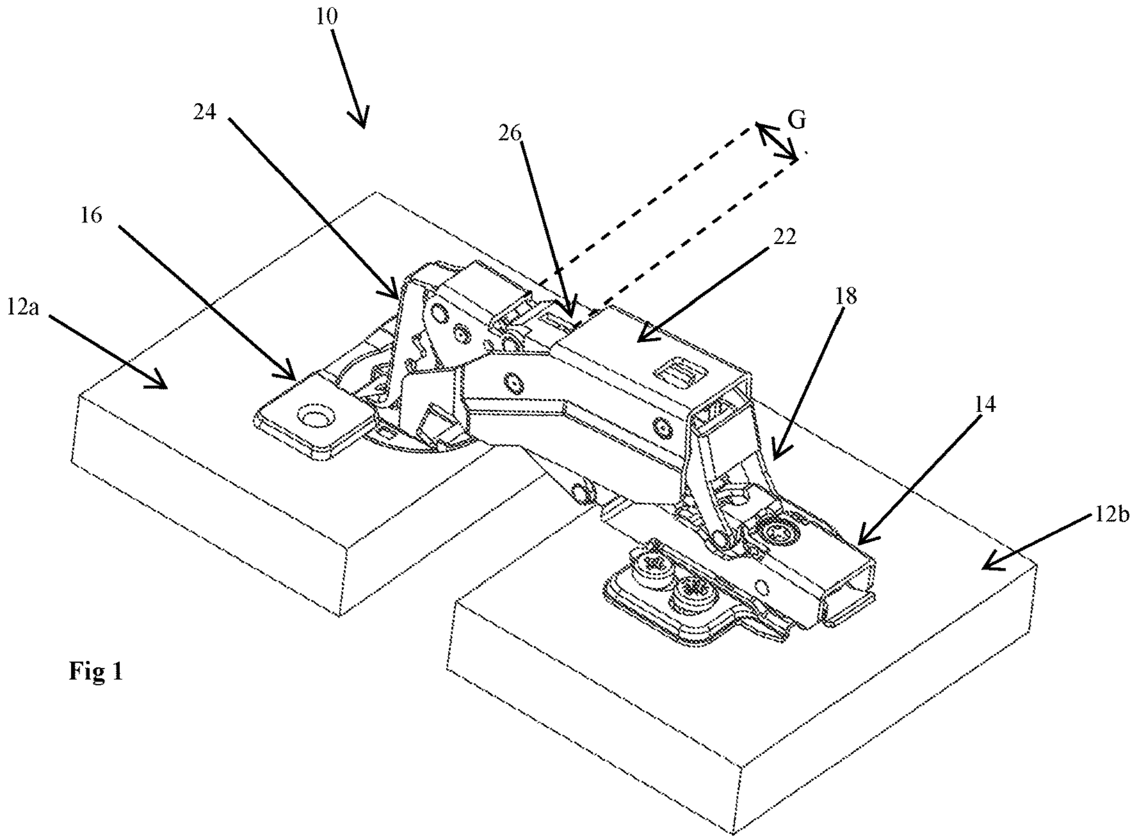
FIG. 1 shows an example of a hinge assembly in accordance with the present invention.
Figure 2:
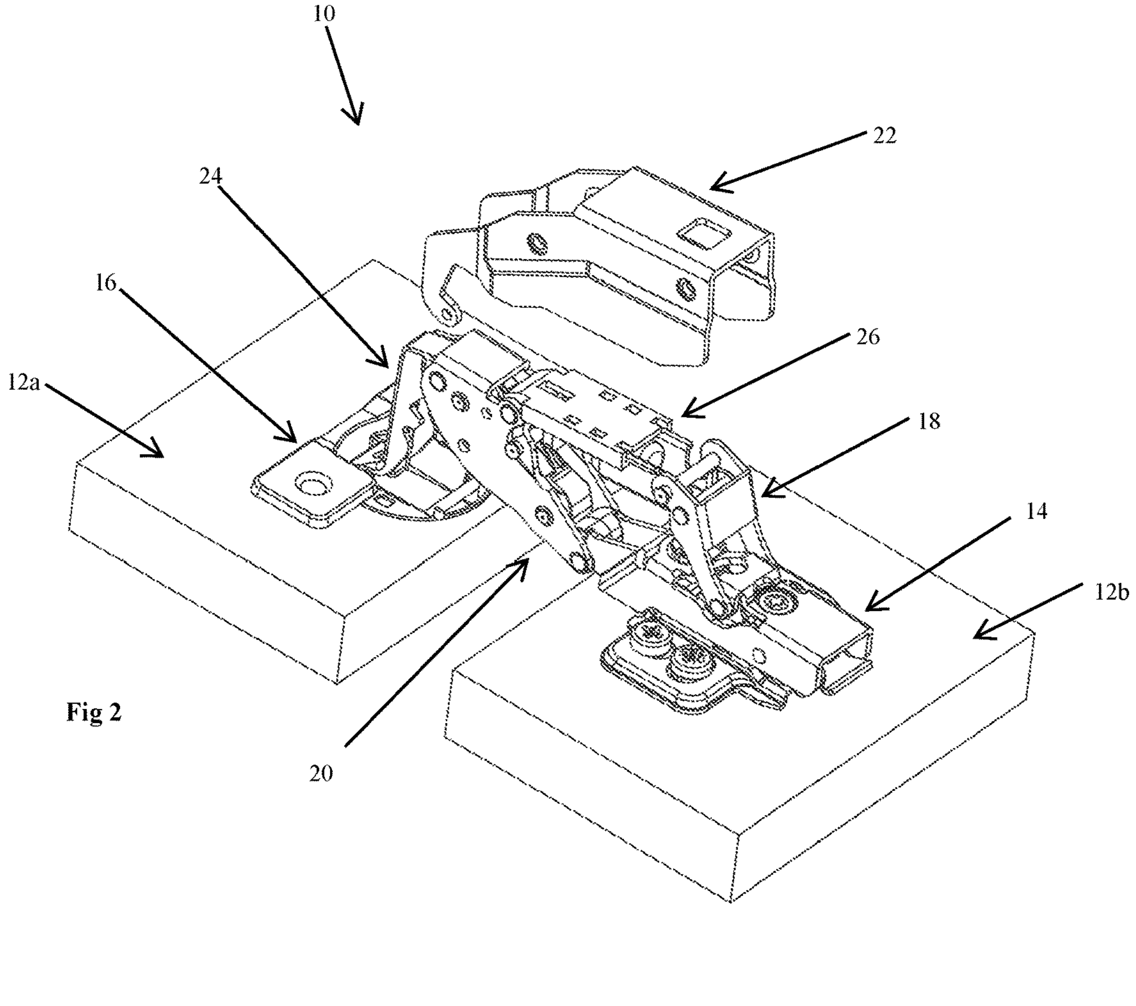
FIG. 2 shows a semi-exploded view of the hinge assembly of FIG. 1, whereby an intermediate lever is removed to better show a damper assembly.

FIGS. 1 and 2 show a hinge assembly 10. It is operable to support a first furniture piece 12*a* on a second furniture piece 12*b*. The hinge assembly comprises a hinge arm 14 and a hinge cup 16. A link assembly is provided between the hinge cup 16 and the hinge arm 14.

The linkage assembly comprises four levers. A first lever 18 and a second lever 20 are pivotally connected to the hinge arm 14. A third lever 22 and a fourth lever 24 are pivotally connected to the hinge cup 16. In the linkage assembly the second lever is pivotally connected to the third lever, whilst the fourth lever is pivotally connected to both the first and second levers. In this manner the hinge arm 14 and hinge cup 16 are linked by a seven axis linkage assembly.

A damper assembly 26 is also provided, and is shown in FIGS. 3*a* to 3*e*. FIGS. 3*a* and 3*b* show the damper assembly assembled with the linear damper in situ. FIGS. 3*c* to 3*e* show the three pieces of the damper assembly 26 separately to allow great understanding of the arrangement. The damper assembly 26 comprises a linear damper 28 that comprises a housing 30. As shown in FIG. 3*c*, the housing 30 comprises a flange 32 that further comprises a protrusion 34.

A piston rod 36 protrudes from the housing 30. The piston rod 36 is operable to reciprocate in and out of the housing to provide a damping function, in a known manner.

The damper assembly comprises a damper support unit 38. The damper support unit 38 comprises two housing sections 38*a* and 38*b*. These are shown engaged together in FIGS. 3*a* and 3*b*. The first housing section 38*a* is pivotally connected to the first lever 18 at pivot point 46. The first housing section 38*a* is shown in FIG. 3*d*. The second housing section 38*b* is pivotally connected to the second lever 20 at pivot point 48. The second housing section 38*b* is shown in FIG. 3*e*. Thus, in total, the linkage assembly comprises nine pivot axes.

It will be noted that the damper assembly is connected between two levers that are themselves connected to the hinge arm 14, rather than the hinge cup 16. Accordingly, the hinge assembly 10 is less susceptible to re-bounce during a high-energy closure.

The first and second housing sections 38*a*, 38*b* are configured to engage in a sliding manner, as also shown in FIG. 2. In the example shown, the first housing section 38*a* comprises a pair of out-facing flanges 40 on either side of the housing. These flanges 40 cooperate with channels 42 on the second housing section 38*b*. Thus, the flanges 40 are operable to slide along the channels 42.

The linear damper 28 is retained between the sections of the damper support unit 38, but is able to slide with respect to both sections.

The second support housing 38*b* comprises an aperture 44 dimensioned to accept the protrusion 34 on the flange 32 of the damper housing 30. The protrusion is able to slide along the aperture 44 so as to define a path of travel. This path of travel limits the movement of the linear damper 28 within the damper support unit 38. Of course, the protrusion 34 could be located on the second support section 38*b*, and the aperture on the damper housing 30.

The second support housing 38*b* comprises a surface 50 operable to engage with the piston rod 36. As the damper support unit 38 is squeezed together during closure of the hinge assembly 10, the surface 50 of the second support housing 38*b* pushed the piston rod 36 into the damper housing 30.

The first housing section 38*a* is shaped such it engages with the flange 32 in the damper housing 30. The embodiment shown in FIG. 3*d* comprises a U-shaped cross-section. However, any configuration that 1) suitably engages with the damper housing 30 to prevent relative movement between the damper housing 30 and the first housing support 38*a*, and 2) slidably engages with the second support housing 38*b* will suffice. During closure of the hinge assembly 10, the first and second housing sections 38*a*, 38*b* are slid together, with the flange 32 engaging with the first housing section 38*a* such that relative movement between the liner damper 28 and the first housing section 38*a* is prevented. Accordingly, the damper is locked against the first housing section 38*a*, so that the surface 50 of the second support housing 38*b* is operable to depress the piston rod 36 of the damper 28.

Figure 4A:
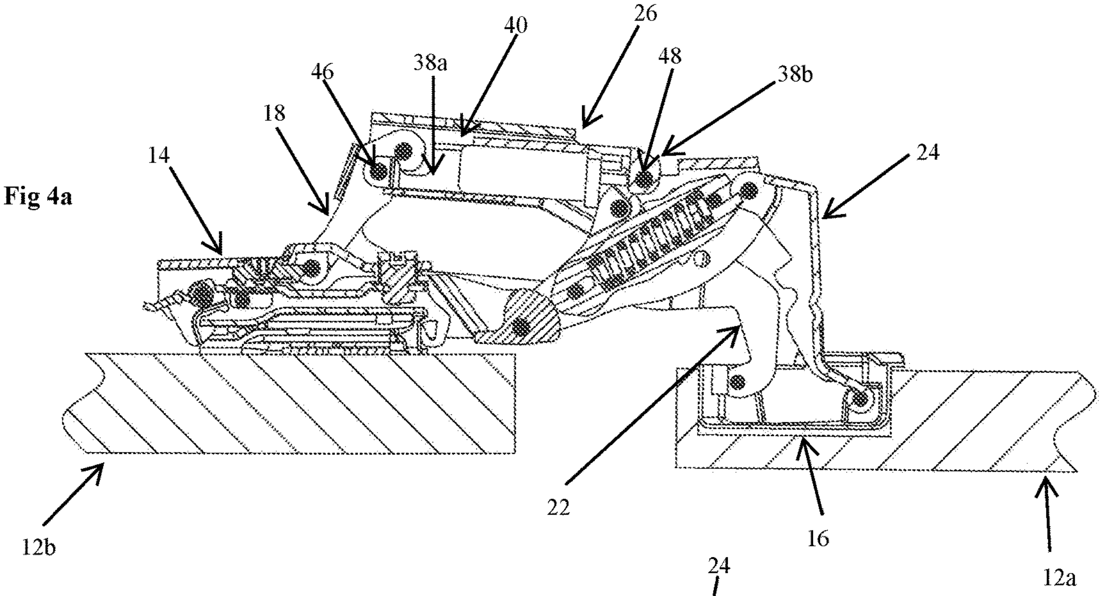
FIGS. 4*a* to 4*c* show a side view of the hinge assembly moving from an open position (FIG. 4*a*) via an intermediate position (FIG. 4*b*) to a fully closed position (4*c*).
Figure 4B:
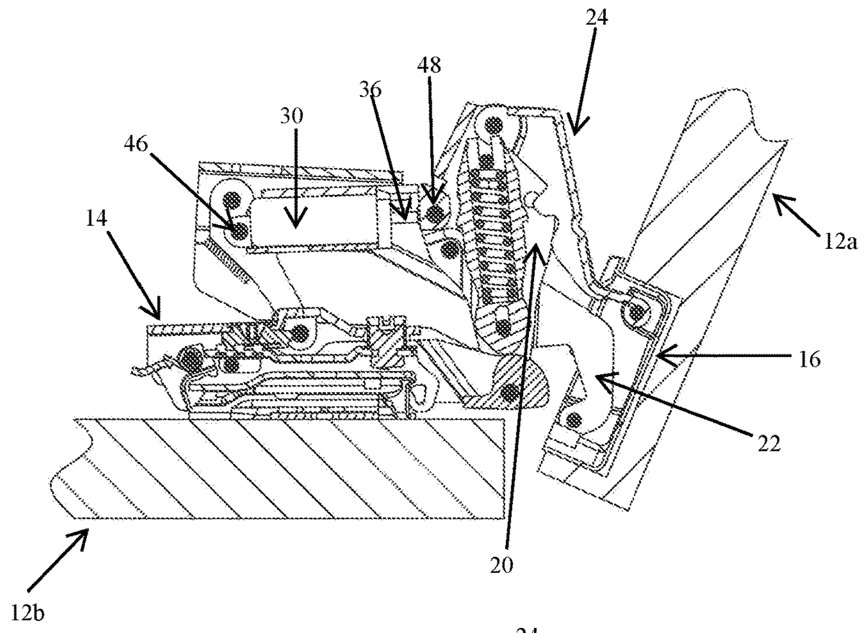
Figure 4C:
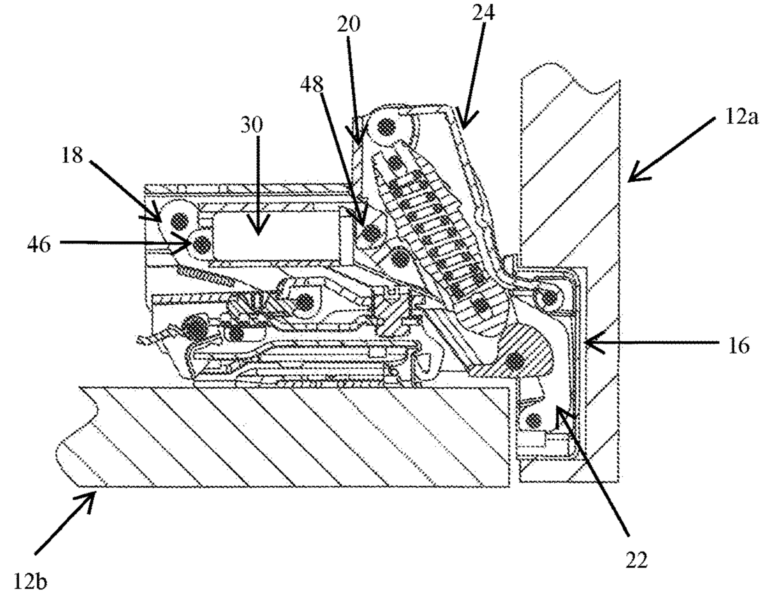

FIGS. 4*a* to 4*c* show the operation of the hinge assembly 10. FIG. 4*a* shows the hinge assembly in an open position (approximately 90°), with FIG. 4*c* showing the fully closed position. FIG. 4*b* shows an intermediary position.

As shown in FIG. 4*a*, the distance between the pivot points 46, 48 of the respective damper support sections 38*a*, 38*b*, is at its largest. Accordingly, the housing sections 38*a*, 38*b* are slid apart. The engagement of the protrusion in the aperture ensures that the linear damper 28 is maintained such that the piston rod 36 is in contact with surface 50. In a variant, the piston rod 36 could directly engage a section of the second lever 20. As the hinge assembly 10 is closed, the linkage moves such that pivot points 46 and 48 are moved closer together. Accordingly, the two sections of the damper support housing are compressed, such that the two pieces slide together.

At the point of the closing action shown in FIG. 4*b*, the flange 32 of the damper housing engages with the first support housing 38*a*. The first damper support section 38*a* is thus in a position to push the damper against the surface 50 of the second support housing 38*b*.

The hinge assembly 10 is shown in its closed position in FIG. 4*c*. The linkage assembly has caused the two sections of the damper support unit 38 to be fully engaged. Put another way, the two sections have been fully slide together such that flanges 40 are fully inserted into channels 42. The flange 32 engages with the first support housing 38*a*, and the surface 50 engages with the piston rod so as to cause it to be depressed into the damper housing. Thus, the damping action of the hinge assembly is performed.

It will be appreciated that in the open position a gap G is formed between levers 20 and lever 22. The gap is indicated on FIG. 1. The gap G is closed as the hinge assembly 10 is closed. By providing the damper support housing in a position to bridge the gap G, it is possible to avoid injury with a potential pinch point.

By providing the damper assembly under lever 22, it is possible to prevent debris from entering the damping assembly, thus prolonging its working life.

Furthermore, because the damper is positioned beneath the linkage assembly, it takes up less space in the furniture unit to which it is attached.

The foregoing is provided for example only, and many variations are contemplated by the attached claims.

The invention claimed is:

1. A hinge assembly comprising:
- a first fitment portion;
- a second fitment portion; and
- a linkage assembly, connecting the first fitment portion and the second fitment portion, and comprising at least seven hinge axes, wherein the linkage assembly comprises two levers directly pivotally mounted to the first fitment portion, wherein the hinge assembly further comprises a damping device pivotally mounted between the said two levers,
- wherein the damping device is supported by a damper support unit,
- wherein the damper support unit is positioned below at least a portion of the linkage assembly, and
- wherein the damper support unit comprises first and second parts, which are pivotally connected to a respective one of said two levers.

2. A hinge assembly according to claim 1, wherein the first fitment portion is a hinge arm, and the second fitment portion is a hinge cup.

3. A hinge assembly according to claim 2, wherein the linkage assembly comprises a third lever pivotally connected to the hinge cup, and wherein the damper support unit is positioned below the third lever.

4. A hinge assembly according to claim 3, wherein the damper support unit is configured to block a gap between one of said levers directly pivotally mounted to the first fitment portion and the third lever.

5. A hinge assembly according to claim 1, wherein the pivot mountings of the damp device are separate to the seven hinge axes of the linkage assembly.

6. A hinge assembly according to claim 1, wherein the first and second parts of the damper support unit are slidably engaged with one another.

7. A hinge assembly according to claim 1, wherein the damping device is operable to slide with respect to the damper support unit.

8. A hinge assembly according to claim 7, wherein one or both of the damping device or the damper support unit comprise means to limit a path of travel of the damping device with respect to the damper support unit.

9. A hinge assembly according to claim 1, wherein the second part of the damper support unit comprises a surface operable to engage with a piston rod of the damping device, and wherein the first part of the damper support unit is configured to push the damping device against the surface.

* * * * *